United States Patent
Back et al.

(10) Patent No.: US 8,621,433 B2
(45) Date of Patent: Dec. 31, 2013

(54) MANAGING VERSION INFORMATION FOR SOFTWARE COMPONENTS

(75) Inventors: Alan B. Back, Redmond, WA (US); James Aaron Holmes, Sammamish, WA (US); Manoj Nayar, Redmond, WA (US); Sridhar Chandrashekar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1945 days.

(21) Appl. No.: 11/384,586

(22) Filed: Mar. 20, 2006

(65) Prior Publication Data

US 2007/0220507 A1    Sep. 20, 2007

(51) Int. Cl.
*G06F 9/44*    (2006.01)
(52) U.S. Cl.
USPC ........... 717/122; 717/120; 717/168; 717/169; 717/170
(58) Field of Classification Search
None
See application file for complete search history.

(56) References Cited

U.S. PATENT DOCUMENTS

| 5,579,509 A * | 11/1996 | Furtney et al. ................... 703/27 |
| 7,743,224 B2 * | 6/2010 | Wang ............................. 711/154 |
| 2003/0159135 A1 * | 8/2003 | Hiller et al. ................... 717/166 |
| 2004/0133444 A1 * | 7/2004 | Defaix et al. ..................... 705/1 |
| 2007/0214453 A1 * | 9/2007 | Dive-Reclus ................. 717/175 |

* cited by examiner

*Primary Examiner* — Lewis A Bullock, Jr.
*Assistant Examiner* — Mark Gooray (57) ABSTRACT

A system manages version information for a group of software components by maintaining a version repository containing version information for all of the components. The system determines a baseline for the components, modifies data in the repository in connection with updating software components, and accesses the data in the repository to determine version information for the components. The system described herein also determines if a group of software components correspond to a particular baseline by maintaining baseline information in the version repository. The system obtains the particular baseline for the group of components, compares the version information for each of the components with a corresponding minimum version provided in connection with the baseline, and determines whether a group of software components correspond to the particular baseline.

20 Claims, 6 Drawing Sheets

MANAGING VERSION INFORMATION FOR SOFTWARE COMPONENTS

BACKGROUND

Relatively large and complex computer software programs, such as computer operating systems, may have a number of separate components that work together. In some cases, maintainers of large and complex computer software programs may provide new versions of some of the components without necessarily providing new versions of others, thus making it difficult to ascertain which versions of which components work best together. Furthermore, when the large and complex computer software program is a computer operating system, it may be necessary for other programs, such as application programs, to ascertain the version of the operating system. However, this may be difficult in situations where the operating system is comprised of various components, some of which may have different version numbers.

In addition to the potential for different version numbers for different components, it may be desirable to cause new components to be part of the "baseline" of a relatively large and complex software program where the baseline represents the collection of components, and the minimum versions thereof, that make up the program. However, conventional software update mechanisms, while capable of modifying/updating existing software components, may not necessarily be capable of causing the new components to be part of the baseline of a relatively large and complex software program.

It is desirable to provide a system that addresses these issues to provide better management of component versioning and a mechanism for adding components to a baseline for a relatively large and complex computer software program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system described herein manages version information for a group of software components by maintaining a version repository containing version information for all of the components, determining a baseline for the components, modifying data in the repository in connection with updating at least one of the software components, and accessing the data in the repository to determine version information for the components. Accessing the data includes determining whether each of the components has a version number greater than or equal to a minimum version number corresponding to a particular baseline. The group of software components may correspond to a computer operating system.

The system described herein determines if a group of software components correspond to a particular baseline by maintaining a version repository containing version information for all of the components, obtaining the particular baseline for the group of components, comparing the version information for each of the components with a corresponding minimum version provided in connection with the baseline, and determining that a group of software components corresponds to the particular baseline if each of the components has a version number greater than or equal to the minimum version number corresponding to the particular baseline. The baseline information about the group of components may be stored in the version repository.

The system described herein facilitates adding components to an integrated software program having multiple components by providing the integrated software program with a first baseline that indicates which components are part of the integrated software program. The system revises the first baseline to provide a second baseline, and runs an update process on the integrated software program using the second baseline. In response to the update process detecting a component in the second baseline that is not in the integrated software program, the update process causing the component to be added to the integrated software program.

DETAILED DESCRIPTION

Described herein are various technologies and techniques for handling version information for a plurality of related software components. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

The system described herein handles version information for software components. A software component may be a module, a library, a stand-alone program, or any other portion of software that may be part of a larger whole while being released and/or updated separate from at least some other parts of the whole. A component may have a version associated with it, where the version indicates the relative age/release date of the component with respect to other versions of the same component. Version information may be in the form of a number, although version information could also be in the form of letters, other symbols, or any other appropriate mechanism for indicating relative age/release date of a component. In some instances, version information may include major and minor numbers with a decimal point therebetween (e.g., version 6.3), where the major number, to the left of a decimal point, indicate relatively major revisions while the minor number, to the right of the decimal point, indicate relatively minor revisions. The version information may also indicate the language information for the software (e.g., English, Japanese, etc.).

In addition, a group of components may be associated with an integrated software program, such as a computer operating system. In addition, there may be a baseline for the program that represents a minimum set of components and minimum version numbers for those components. The baseline may be set by the manufacture/vendor of the integrated software program. In addition, a particular integrated software program may have a number of baselines associated therewith, where each of the baselines represents a minimum set of components and version numbers for those components at a particular date. Note also that the baseline may be used to add or remove components for an integrated software program, such as an operating system, by controlling the list of components included with the baseline. Use of baselines and version numbers is described in more detail below.

Figure 1:
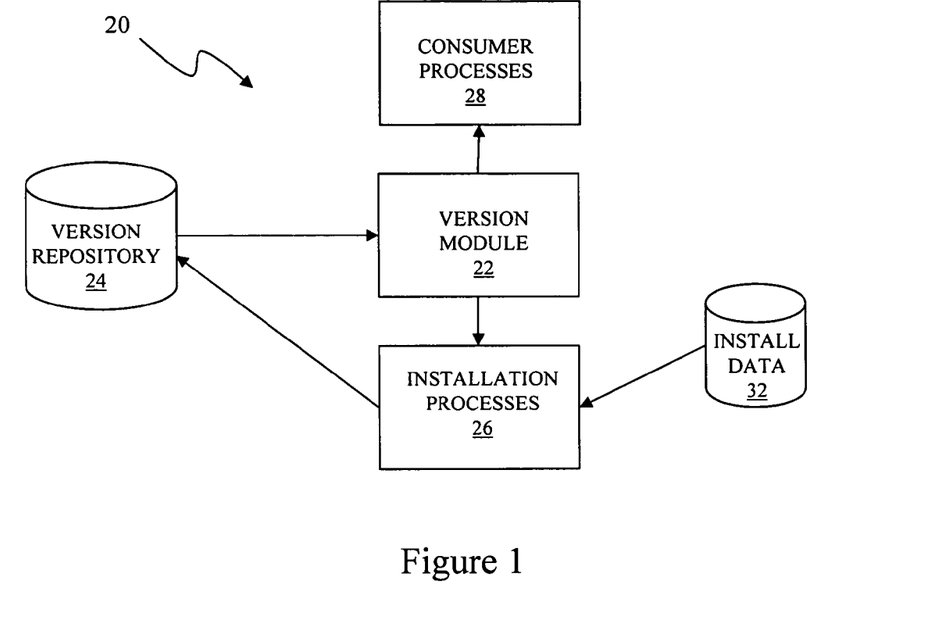
FIG. 1 is diagram illustrating a version module, a version repository, consumer processes, installation processes, and installation data according to the system described herein.

Referring to FIG. 1, a diagram 20 illustrates a version module 22 and a version repository data element 24. The version module 22 manages version information for components of an integrated software program, such as a computer operating system, that has many separate, but usually related, components. As described in more detail elsewhere herein, the version module 22 may provide version information about specific components and/or may provide information about a particular baseline for an integrated software program. In some instances, described in more detail elsewhere herein, the version module 22 may be used to determine if all of the components of an integrated software program correspond to a particular baseline.

The version repository 24 contains data used by the version module 22. In an embodiment herein, the version repository 24 may be writeable only by trusted processes, such as processes that install and/or update components of the integrated software program, trusted processes that install new applications, etc. Allowing only trusted processes to modify the version repository is useful because it helps maintain the integrity of the data/baseline information. Otherwise, for example, a virus or other malicious program to damage the baseline data, making it difficult to maintain the system.

In some instances, the version repository 24 may only contain information about a single integrated software program, such as a computer operating system. In other instances, it is possible for the version repository 24 to contain information about more than one integrated software program. The version repository may also contain version information about other related programs or components such as application programs. For example, the version repository 24 may contain version information about a particular baseline of a computer operating system as well as version information about application programs running on the same computer as the operating system.

The diagram 20 also shows installation processes 26 that represent processes/programs/components used to install applications, operating system components, an entire operating system, library components, or any other module, component, or portion thereof used on a computer. The installation processes 26 may be explicitly invoked by a user, invoked by another application, invoked by the operating system, and/or part of automatically scheduled software updates that occur periodically. The installation processes 26 may make calls to, and receive information from, the version module 22 to obtain version and/or baseline information therefrom in connection with performing installation.

The diagram 20 also shows other consumer processes 28 which make calls to, and receive information from, the version module 22 to obtain version and/or baseline information therefrom. The other consumer processes 28 may include any process, component, software program, or collection thereof or portion thereof that uses version information provided by the version module 22. For example, it is possible to provide a user application that displays the versions of applications stored on a user's computer and/or displays version information about the operating system to a user. In addition, other possible consumer processes 28 include portions of the operating system that may receive version information about other components of the operating system in order to, for example, perform specific processing that depends upon the particular version of the other components. Similarly, it is possible to have an application that provides particular functionality or takes some other action depending on the particular version of other components, applications, and/or portions of the operating system. Thus, generally, the consumer processes 28 represent any entity that obtains version and/or baseline information using the version module 22 as described herein.

The installation processes 26, and other similar processes that modify the version repository 24, may be trusted processes (e.g., processes run by an administrator or equivalent). In contrast, the consumer processes 28 do not necessarily need to be trusted processes since the consumer processes 28 do not alter data in the version repository 24. However, it is possible to implement a policy where only certain users/processes are allowed access to version information.

The installation process 26 receives installation data 32 in the form of a new/updated application or component information. For example, the installation data 32 may be a new application, a new operating system component, or new version of an already-installed application or component. The installation processes 26 update the application or component on a computer system and make corresponding modifications to the version repository 24 to reflect the update/new installation. Thus, in general, the installation processes 26 represents any process or mechanism for updating/installing software components on a computing system. In an embodiment herein, the installation processes 26 may include one or both of the CBS and the MSI installation mechanisms used with the Windows® operating system and applications running therewith. Thus, the system described herein may be implemented with any number of different types of installation programs/processes. CBS corresponds to the Component Based Servicing API, which is the application programming interface of a trusted installation service used to install and service Windows Vista and Windows Server (Longhorn) components. Client installers such as Windows Update or Windows Installer work with CBS to enumerate, install, update, and uninstall component packages from the system.

MSI refers to the Windows Installer, an engine for the installation of programs on Microsoft Windows systems. As illustrated in the diagram 20, the installation processes 26 may write and/or modify data in the version repository 24 to update information regarding an operating system baseline, update version information about a component installed by the installation processes 26, update version information about an application installed by the installation processes 26, or make any other appropriate modification of the data in the version repository 24 in accordance with the discussion herein.

Figure 2:
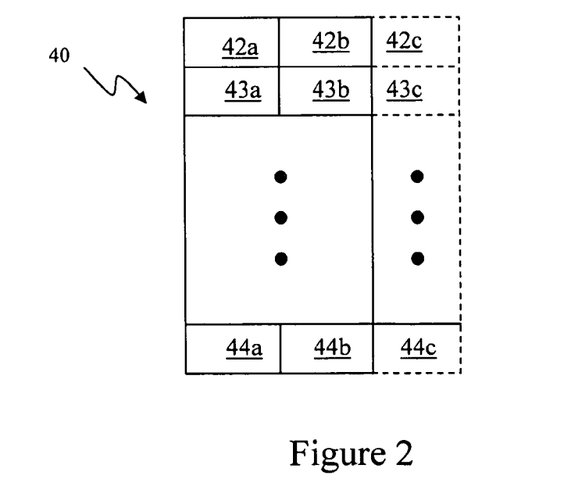
FIG. 2 is a table that stores component ID information, version information, and additional information according to the system described herein.

Referring to FIG. 2, a table 40 illustrates one possible mechanism for storing component version information in the version repository 24. The table 40 may represent specific version information for components of an integrated software program installed on a computer (e.g., a computer operating system). The table 40 may also be used to represent baseline information for an integrated software program. Thus, the version repository 24 may contain multiple tables for a single integrated software program: a first table corresponding to the actual version numbers of components installed on a computer system and a number of other tables corresponding to different baselines for the integrated software program. In other instances, only the first table may be used and, if needed, baseline information may be obtained from another source, such as directly from the manufacturer/vendor of the integrated software program. In some instances, an integrated software program may be shipped/initially installed with baseline information and the baseline information may be updated periodically (e.g., over the Internet) as new baselines and possibly corresponding components are updated/released.

Each of the elements of the table 40 includes a component ID data element, a version data element, and possibly a related data element. The component ID data element may take on any form appropriate for identifying software components (e.g., an ASCII string). In some cases, one or more particular conventions or standards may be used so that the component ID data may be used by any of the other consumer processes 28 (and the installation processes 26) that adhere to the convention. Similarly, the version data element may be in the form of a number, a letter, a symbol, a group of symbols, or any form appropriate for conveying symbol information and may be provided according to one or more particular conventions or standards.

Thus for, for example, one entry in the table has a component ID 42a, a corresponding version 42b, and a related data element 42c. The related data element 42c may be any data related to the component ID 42a and/or the version 42b, such as the corresponding baseline of the integrated software program to which the component belongs, the type of installation used to install/update the component (e.g., MSI or CBS), or any other appropriate information. Similarly, another entry of the table 40 has a component ID 43a, a corresponding version 43b, and related data 43c while yet another entry of the table 40 has a component ID 44a, a version 44b, and related data 44c. The table 40 may contain any number of entries corresponding to any number of components/modules/applications. The table 40 may be in the form of an array that is indexed by an index value used to uniquely access an appropriate one of the entries.

Figure 3A:
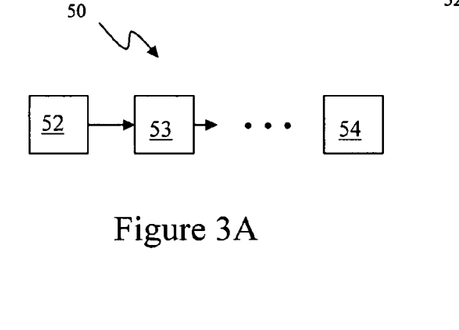
FIGS. 3A and 3B illustrate a linked list that stores component ID information, version information, and additional information according to the system described herein.

Referring to FIG. 3A, a diagram 50 illustrates an alternative embodiment for storing component and corresponding version and related data information where the information is stored in a linked list having a plurality of entries 52-54 that are linked together in a conventional fashion. There may be as many entries 52-54 as there are components corresponding to a particular baseline (and possibly additional related components/modules/applications). The last one of the entries of the linked list may have a null value in the next field indicating the end of the linked list. An initial or head pointer may point to the first one of the entries 52-54.

Figure 3B:
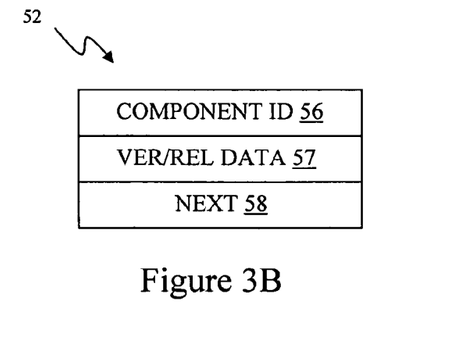

Referring to FIG. 3B, one of the entries 52 is shown in more detail as including a component ID field 56, version/related data field 57, and a next field 58. The next field 58 is used to point to the next one of the entries in the linked list. The component ID field 56 and the version/related data field 57 are like the component ID, version, and related data entries discussed above in connection with the table 40 of FIG. 2.

Figure 4:
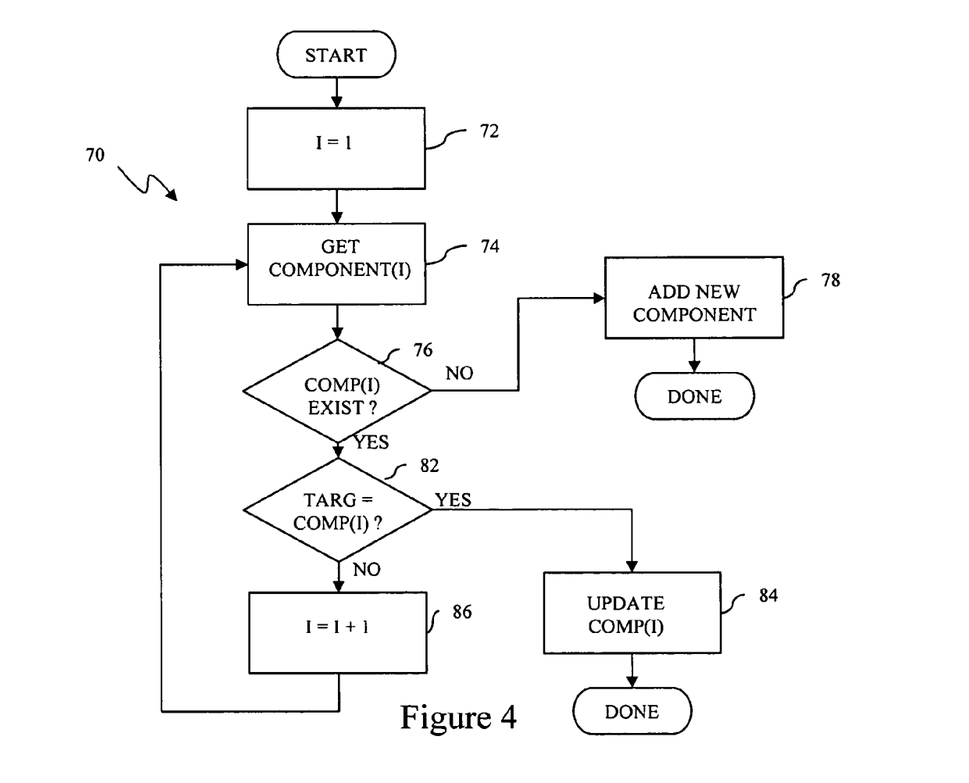
FIG. 4 is a flow chart illustrating updating/adding a version number for a software component according to the system described herein.

Referring to FIG. 4, a flowchart 70 illustrates steps performed in connection with updating a version number for a target component (i.e., a particular component). The processing illustrated by the flowchart 70 may be performed, for example, by the installation process 26 to update data in the version repository 24 after the installation processes have installed or updated a component and/or application and/or any other appropriate software module or a combination of modules/components tracked by the system described herein.

Processing begins at a first step 72 where an index variable, i, is set equal to one (or some other initial value). The index variable, i, may be used to iterate through each of the components. In an embodiment herein, calls may be made to the version module 22 by the installation processes 26 or by the consumer processes 28 that pass the index in to the version module 22. The version module 22 uses the index to access data in the version repository 24. For example, if the data in the version repository 24 is stored in a manner like in the table 40 of FIG. 2, the index may be used to select a specific entry of the table 40. Generally, irrespective of the internal storage mechanism used in the version repository 24, there is a mapping of index values to components used by the version module 22 and processes making calls thereto. The calling process may already know which indexes correspond to which components or the calling process may iterate through possible index variables to find a matching component of interest. If a call is made to the version module 22 with an index value that does not correspond to any component (e.g., an index value higher than the number of components that are being tracked), then a particular error code is returned to the calling process indicating that there is no component corresponding to the index passed thereto. For the discussion herein, a particular component may be referred to component(n), where n is an index value corresponding to the particular component. In an embodiment herein, version information for component (n) is not cached by the version module but, instead, the version module 22 checks the data in the version repository 24 each time a request is made for version information.

Following the step 72 is a step 74 where the calling process (e.g., a process of the installation processes 26) obtains information for component(i). The information may be obtained at the step 74 by having the calling process call a routine in the version module 22 requesting version information about the ith component in the version repository 24. Thus, the installation processes 28 pass the index variable i to the version module 22 and the version module returns the component information. In an embodiment herein, the component information may be provided from the version module 22 to a calling process, such as the installation processes 28, in the form of a character string and, possibly, an error code (with possibly a special error code indicating that no error has occurred).

Following the step 74 is a test step 76 where it is determined if the error code returned by the version module 22 indicates that there is no component in the version repository 24 corresponding to the index i. If it is determined at the test step 76 that the error code returned by the version module 22 indicates that component i does not exist, then control passes from the test step 76 to a step 78 where a new component, corresponding to the component being installed by the installation processes 28, is added to the version repository 24 by appropriately modifying the data therein. Following the step 78, processing is complete.

If it is determined at the test step 76 that there is component information for component(i), then control transfers from the test step 76 to a test step 82 where it is determined if the target component (component being updated by the installation processes 28) corresponds to component(i) retrieved at the step 74. If so, then control transfers from the test step 82 to a step 84 where the version information for component(i) is updated. Updating the information at the step 84 includes modifying the version information and, possibly, modifying related data information for the particular component. Following the step 84, processing is complete.

If it is determined at the test step 82 that the target component does not correspond to component(i), then control transfers from the test step 82 to a step 86 where the index variable, i, is incremented. Following the step 86, control transfers back to the step 74, discussed above, where information for component(i) (with the incremented value for i) is fetched.

Figure 5:
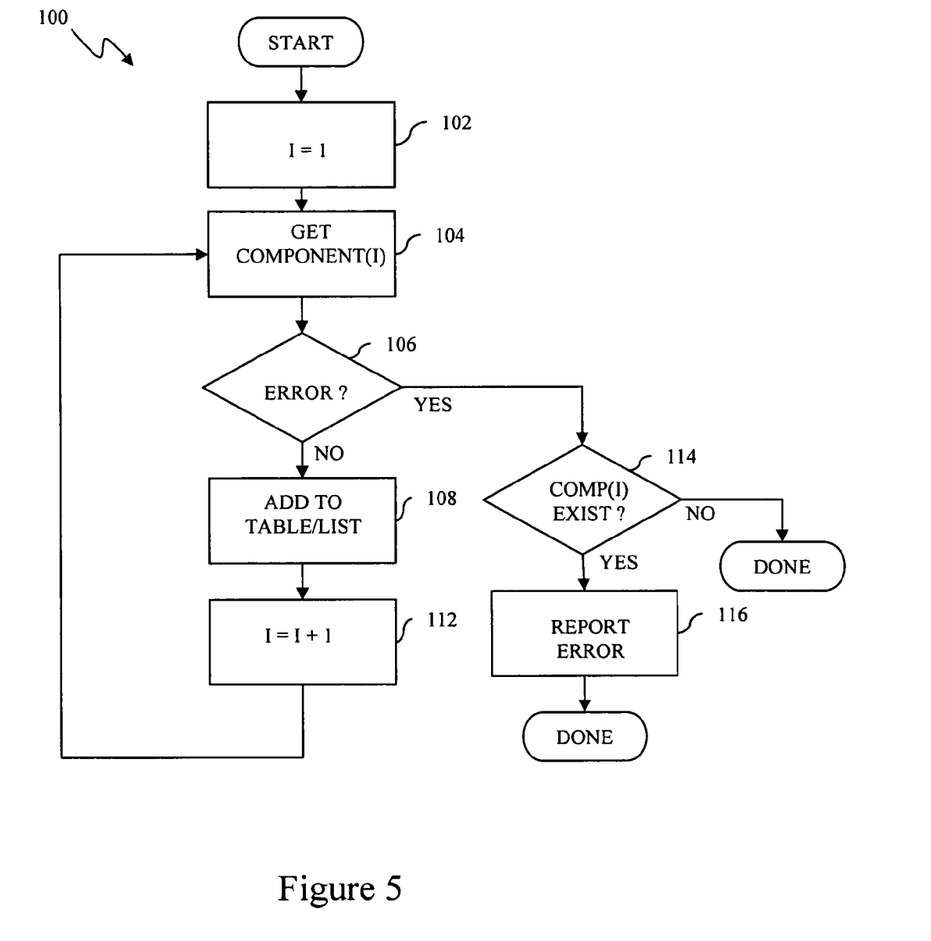
FIG. 5 is a flow chart illustrating constructing a table of components and corresponding versions according to the system described herein.

Referring to FIG. 5, a flowchart 100 illustrates steps performed by an other consumer process 28 to construct a table of component information with versions (and possibly related data) using data in the version repository 24. An other consumer process 28 may construct such a table for a number of reasons, such as having local access to version information without needing to call the version module 22.

Processing begins in a first step 102 where an index variable, i, is set equal to one (or some other initial value). Following the step 102 is a step 104 where a call is made to the version module 22 to get information about component(i). Following the step 104 is a test step 106 which determines if an error occurred in connection with getting information about component(i). If not, then control transfers from the test step 106 to a step 108 were the new information fetched at the step 104 is added to the table being constructed by the other consumer process 28. Following the step 108 is a step 112 were the index variable, i, is incremented. Following the step 112, control transfers back to the step 104 for another iteration.

If it is determined at the test step 106 that the fetching component information at the step 104 resulted in an error, then control transfers from the test step 106 to a test step 114 where it is determined if the error indicates that there is no component corresponding to the value of the index variable, i. If so, then processing is complete (i.e., all of the components have been fetched). Otherwise, if some other error has occurred, then control transfers from the test step 114 to a step 116 where the error is reported. Reporting the error at the step 116 (and at other error reporting steps discussed herein) may be by any appropriate means, such as reporting the error to a user, logging the error, etc. Following step 116, processing is complete.

Figure 6:
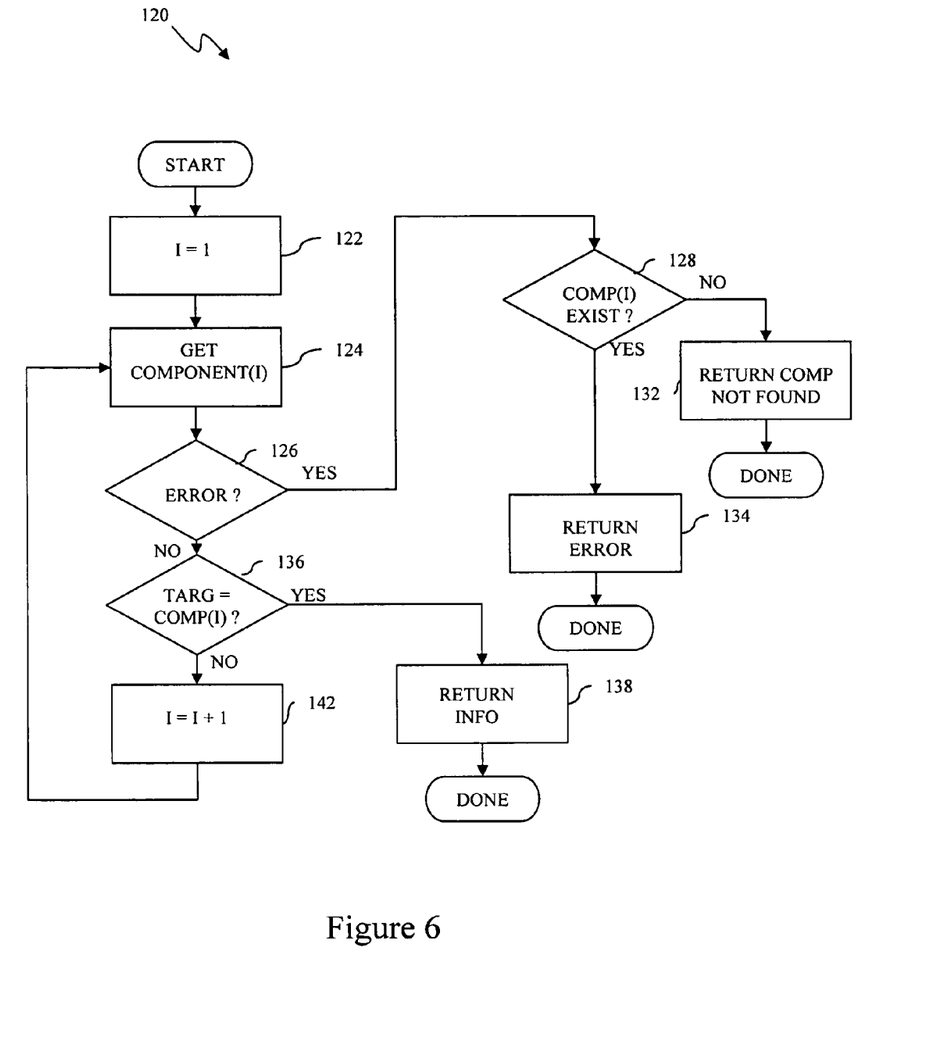
FIG. 6 is a flow chart illustrating obtaining version information about specific target components according to the system described herein.

Referring to FIG. 6, a flowchart 120 illustrates steps performed in connection with obtaining version information about a specific target component. Processing begins at a first step 122 where an index variable, i, is set equal to one (or some other initial value). Following the step 122 is a step 124 where a call is made to the version module 22 to get specific component information for component(i). Following the step 124 is a test step 126 where it is determined if attempting to obtain component information at the step 124 resulted in an error. If so, then control transfers from the test step 126 to a test step 128 where it is determined if the error indicates that there is no component information corresponding to the value of the index variable, i. If so, then control transfers from the test step 128 to a step 132 where an error is returned indicating that the target component was not found. Following the step 132, processing is complete. If it is determined at the test step 128 that the error is something other than an indication that there is no component information corresponding to the value of the index variable, i, then control transfers from the test step 128 to a step 134 where the error is reported. Following the step 134, processing is complete.

If it is determined at the test step 126 that no error was generated in connection with fetching information for component(i) at the step 124, then control transfers from the step 126 to a test step 136 where it is determined if component(i) corresponds to the target component (the component of interest). If so, then control transfers from the test step 136 to a step 138 where the information obtained at the step 124 is returned to the calling process. Following the step 138, processing is complete. Otherwise, if it is determined at the test step 136 that the target component does not correspond to component (i), then control transfers from the test step 136 to a step 142 where the index variable, i, is incremented. Following the step 142, control transfers back to the step 124 for another iteration.

Figure 7:
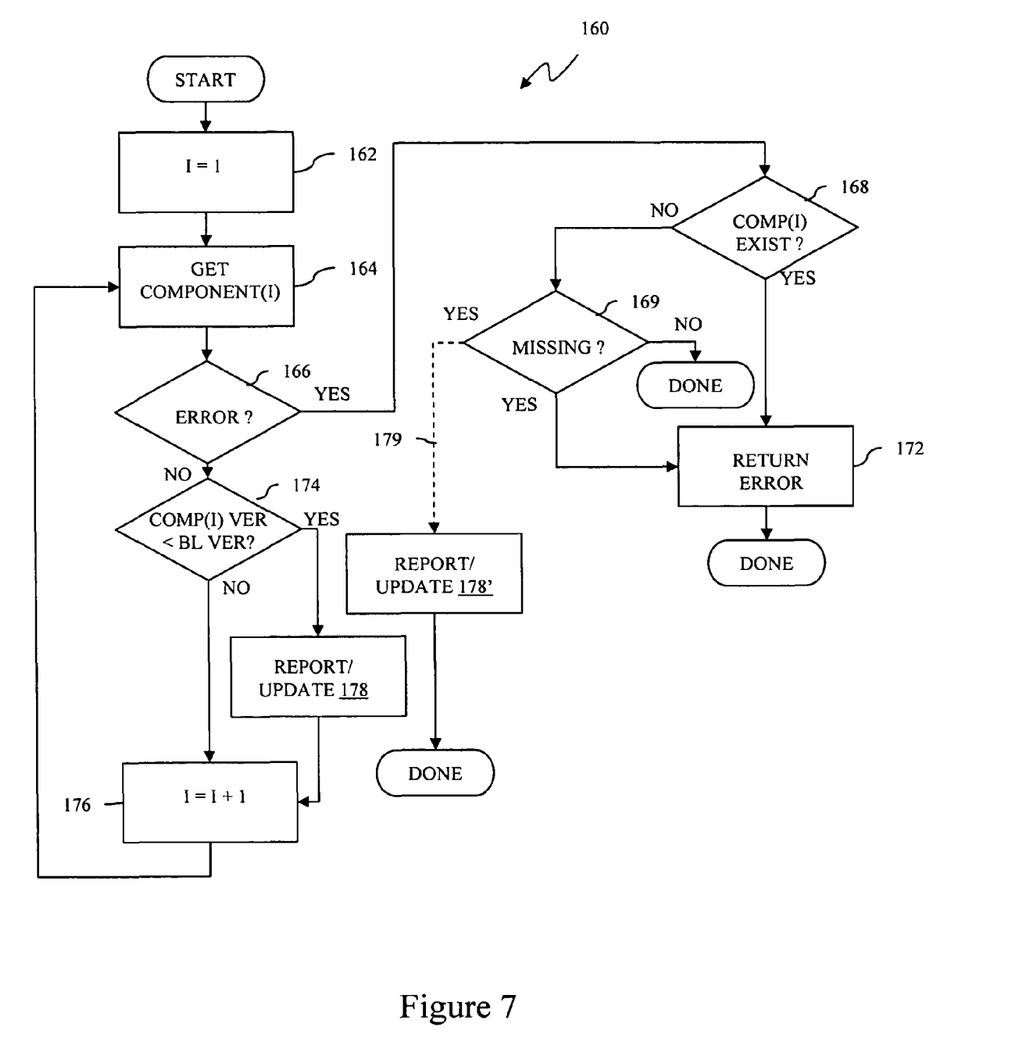
FIG. 7 is a flow chart illustrating checking for and possibly updating out-of-date components according to the system described herein.

Referring to FIG. 7, a flow chart 160 illustrates steps performed in connection with checking for (and possibly updating) out-of-date components in connection with a baseline for an integrated software program, such as an operating system. As discussed elsewhere herein, a baseline version of an integrated software program represents a minimum set of components and minimum version numbers for those components of the integrated software program. Thus, if any of the required components are not present or have a version number that is less than the minimum required version number to comply with the particular baseline, then that particular component is deemed to be out-of-date. Also, as discussed elsewhere herein, baseline information may be provided in a separate table stored in the version repository 24 or may be obtained externally, e.g., from the vendor/manufacturer of the integrated software program. The processing illustrated by the flow chart 160 may also be run in connection with the baseline being revised (updated) so that the integrated software version may be checked (updated) against the new baseline.

In other embodiments, it is possible to deem a component that is not present as being up-to-date. That is, if a particular component is not present, the system does not attempt to update or add the component but, instead, does nothing. In such a case, the system handles components that are not present in the same way the system handles components that are present and up-to-date.

Processing begins in a first step 162 where an index variable, i, is set equal to one (or some other initial value). Following the step 162 is a step 164 where a call is made to the version module 22 to get component information for component(i). Following the step 164 as a test step 166 which determines if an error has occurred in connection with fetching the component information at the step 164. If so, then control transfers from the test step 166 to a test step 168 where it is determined if the error detected at the test step 166 indicates that there is no component information corresponding to the value of the index variable, i. If so, then control transfers to a step 169 where it is determined if any components required for the baseline are missing (i.e., if the current version of the integrated software program does not have all of the components needed for the baseline). If not, then processing is complete. Otherwise, control transfers from the test step 169 to a step 172 where the error is reported. Following the step 172, processing is complete. Note also that the step 172 is reached from the step 168 if the error detected at the test step 166 indicates an error other than there being no component information corresponding to the value of the index variable, i.

If it is determined at the test step 166 that fetching information for component(i) at the step 164 did not result in an error, then control transfers from the test step 166 to a test step 174 where it is determined if the version information for component(i) indicates that the current version of component (i) is less than the minimum required version for the baseline for the integrated software program. If not, then control transfers from the test step 174 to a step 176 where the index variable, i, is incremented. Following the step 176, control transfers back to the step 164 for the next iteration.

If it is determined at the test step 174 that the version information for component(i) is less than the minimum required version for the baseline, then control transfers from the test step 174 to a step 178 to report that the current installed version for component(i) it is less than the minimum required version. Optionally, it is possible at the step 178 to also update component(i) to the minimum required version by, for example, calling an appropriate one of the installation processes 26. However, the ability to update an out-of-date component at the step 178 depends upon there being available appropriate installation/update data 32 for the component. In some cases, the update data 32 may be provided through the Internet. If the appropriate data is not available, then it may not be possible to update the out-of-date component at the step 178. Following the step 178 is the step 176, discussed above, where the index variable, i, is incremented.

Note that, in an alternative embodiment, it is possible to reach a step 178' if it is determined at the step 169 that a particular component required for the baseline is not present in the integrated software program. This is indicated by an alternative path 179 from the step 169 to the step 178'. In such a case, it is possible at the step 178' to call an appropriate one of the installation processes 26 to install the missing component. Following the step 178', processing is complete.

Figure 8:
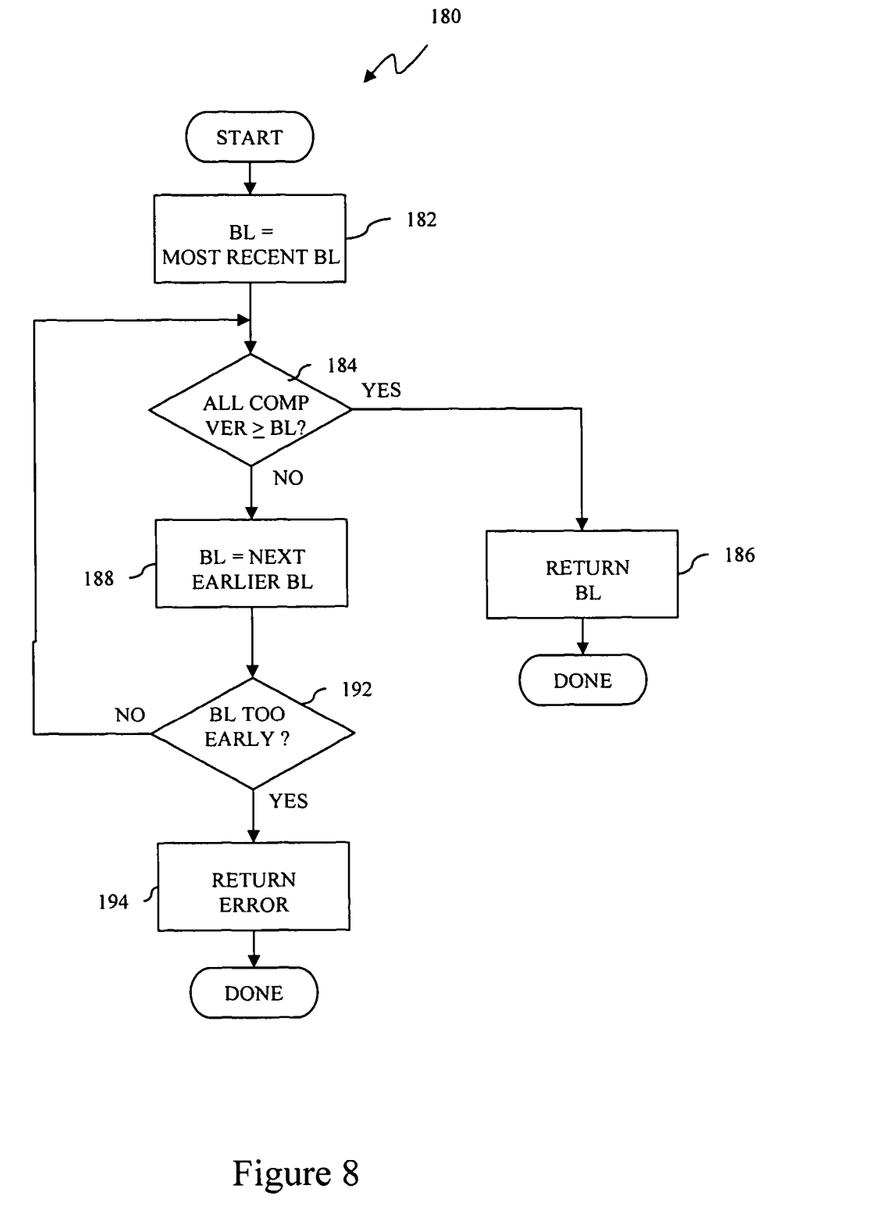
FIG. 8 is a flow chart illustrating determining a current baseline according to the system described herein.

Referring to FIG. 8, a flowchart 180 illustrate steps performed in connection with determining the current baseline for an integrated software program. The steps of the flowchart 180 assume that it is desirable for one of the consumer processes 28 to ascertain the particular baseline for an already-installed integrated software program. Of course, in some cases (discussed elsewhere herein) baseline information is readily available in the version repository 24. However, in cases where baseline information is not available in the version repository 24, it may be desirable to use the processing illustrated by the flowchart 180 to ascertain the baseline of a particular installed integrated software program.

Processing begins at a first step 182 where a baseline variable, BL, is set to the most recent known baseline that exists for the integrated software program. Thus, for example, a particular operating system may have a known set of baselines where one of the known set of baselines is the most recently released baseline for the operating system. Following the step 182 is a test step 184 where it is determined if all the components of the integrated software program have a version that is greater than or equal to version numbers corresponding to the baseline BL. The test at the step 184 may be performed using, for example, the processing illustrated by the flowchart 160, discussed above.

If it is determined that the test step 184 that all components of an integrated software program have a version number that is greater than or equal to the minimum required version number for the baseline BL, then control transfers from the test step 184 to a step 186 where the baseline BL is returned to the calling process. Following the step 186, processing is complete.

If it is determined at the test step 184 that not all components of the integrated software program have a version number that is greater than the minimum required version number for the baseline BL, then control transfers from the test step 184 to a step 188 where the baseline variable, BL, is set to be the next earliest baseline for the particular integrated software program. Thus, at the step 188, the baseline variable, BL, is decremented to an earlier version of the baseline for the integrated software program.

Following the step 188 is a test step 192 where it is determined if the baseline variable, BL, has been decremented to be prior to the earliest known baseline for the integrated software program. If so, then control transfers from the test step 192 to a step 194 where an error is reported. Note that, if the step 194 is reached, it means that there is at least one component of the integrated software program having a version that is less than the minimum required version for the earliest known baseline for the integrated software program. Following step 194, processing is complete. If it is determined at the test step 192 that the baseline variable, BL, is not before the earliest known baseline for the integrated software program, then control transfers from the test step 192 back to the step 184, discussed above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of managing information for software components of an integrated software program, the method comprising:

maintaining, on a computer running the integrated software program, a version repository containing version information for all of the software components of the integrated software program that are on the computer;

maintaining, in the version repository separately from the version information, baseline information for a set of baselines for the integrated software program, wherein the baseline information is received from a manufacturer of the integrated software program and each baseline in the set of baselines represents a minimum set of software components for the integrated software program and a minimum version number for each software component of the minimum set required by the manufacturer of the integrated software program to comply with each baseline;

modifying the version information in the repository in connection with updating at least one of the software components of the integrated software program that is on the computer;

accessing, from the version repository, the version information for the software components of the integrated software program that are on the computer following the updating of the integrated software program;

determining, based on the baseline information maintained in the version repository, whether each software component of the integrated system that is on the computer following the updating of the integrated program has a version number greater than or equal to a minimum version number of a corresponding software component of a minimum set of software components represented by a most recent baseline in the set of baselines; and reporting, to a consumer process, a baseline of the integrated software program on the computer as a particular baseline in the set of baselines that is earlier than the most recent baseline when all of the software components of the integrated software program that are on the computer do not have a version number that is greater than or equal to the minimum version number of a corresponding software component of the minimum set of software components represented by the most recent baseline in the set of baselines.

2. A method, according to claim 1, wherein the integrated software program is a computer operating system.

3. A method, according to claim 1, wherein only trusted installation processes operating on the computer are allowed to modify data in the version repository.

4. A method, according to claim 3, wherein any consumer process operating on the computer is allowed to obtain data from the version repository irrespective of trust level.

5. A method, according to claim 1, wherein the version information is provided to a user application for display to a user.

6. A method, according to claim 1, wherein accessing the version information in the version repository includes providing an index value that corresponds to specific software component version information.

7. A method, according to claim 6, wherein an error code is received in response to attempting to access version information in the version repository using an index value that does not correspond to any software component of the integrated software program that is on the computer.

8. A computer-readable medium not consisting of a signal, the computer-readable medium storing computer-executable instructions that, when executed, cause a computer to perform a method of managing information for software components of an integrated software program, the method comprising:
 maintaining, on the computer, a version repository containing version information for all of the software components of the integrated software program that are on the computer;
 maintaining, in the version repository separately from the version information, baseline information for a set of baselines for the integrated software program, wherein the baseline information is received from a manufacturer of the integrated software program and each baseline in the set of baselines represents a minimum set of software components for the integrated software program and a minimum version number for each software component of the minimum set required by the manufacturer of the integrated software program to comply with each baseline;
 modifying the version information in the repository in connection with updating at least one of the software components of the integrated software program that is on the computer;
 accessing, from the version repository, the version information for the software components of the integrated software program that are on the computer following the updating of the integrated software program;
 determining, based on the baseline information in the version repository, whether each software component of the integrated software program has a version number greater than or equal to a minimum version number of a corresponding software component of a minimum set of software components represented by a most recent baseline in the set of baselines; and
 reporting, to a consumer process, a baseline of the integrated software program on the computer as a particular baseline in the set of baselines that is earlier than the most recent baseline when all of the software components of the integrated software program that are on the computer do not have a version number that is greater than or equal to the minimum version number of a corresponding software component of the minimum set of software components represented by the most recent baseline in the set of baselines.

9. A computer comprising:
a processor for executing computer executable instructions; and
memory storing computer executable instructions that, when executed by the processor, cause the computer to perform a method of managing information for software components of an integrated software program running on the computer, the method comprising:
 maintaining, on the computer, a version repository containing version information for all of the software components of the integrated software program that are on the computer;
 maintaining, in the version repository separately from the version information, baseline information for a set of baselines for the integrated software program, wherein the baseline information is received from a manufacturer of the integrated software program and each baseline in the set of baselines represents a minimum set of software components for the integrated software program and a minimum version number for each software component of the minimum set required by the manufacturer of the integrated software program to comply with each baseline;
 modifying the version information in the repository in connection with updating at least one of the software components of the integrated software program that is on the computer;
 accessing, from the version repository, the version information for the software components of the integrated software program that are on the computer following the updating of the integrated software program;
 determining, based on the baseline information in the version repository, whether each software component of the integrated software program has a version number greater than or equal to a minimum version number of a corresponding software component of a minimum set of software components represented by a most recent baseline in the set of baselines; and
 reporting, to a consumer process, a baseline of the integrated software program on the computer as a particular baseline in the set of baselines that is earlier than the most recent baseline when all of the software components of the integrated software program that are on the computer do not have a version number that is greater than or equal to the minimum version number of a corresponding software component of the minimum set of software components represented by the most recent baseline in the set of baselines.

10. A computer, according to claim 9, wherein the method further comprises:
 receiving baseline information for a new baseline for the integrated software program from the manufacturer of the integrated software program; and updating the baseline information for the set of baselines for the integrated software program which is stored on the computer in the version repository.

11. A computer, according to claim 9, wherein the integrated software program is a computer operating system.

12. A computer, according to claim 9, wherein the version information is provided to a user application for display to a user.

13. A computer, according to claim 9, wherein the version information in the version repository is accessed by providing an index value that corresponds to specific software component version information.

14. A computer, according to claim 13, wherein an error code is received in response to attempting to access version information in the version repository using an index value that does not correspond to any software component of the integrated software program that is on the computer.

15. A method, according to claim 1, further comprising: reporting, to an installation process operating on the computer, that a particular software component on the computer is out-of-date when the particular software component has a version number less than the minimum version number of a corresponding software component of the minimum set represented by the most recent baseline in the set of baselines.

16. A method, according to claim 15, further comprising: updating, by the installation process, the particular software component to the minimum version number of the corresponding software component of the minimum set represented by the most recent baseline in the set of baselines.

17. A method, according to claim 1, further comprising: receiving baseline information for a new baseline for the integrated software program from the manufacturer of the integrated software program; and
updating the baseline information for the set of baselines for the integrated software program which is stored on the computer in the version repository.

18. A computer, according to claim 9, wherein the method further comprises:
reporting, to an installation process operating on the computer, that a particular software component on the computer is out-of-date when the particular software component has a version number less than the minimum version number of a corresponding software component of the minimum set represented by the most recent baseline in the set of baselines; and
updating, by the installation process, the particular software component to the minimum version number of the corresponding software component of the minimum set represented by the most recent baseline in the set of baselines.

19. A method, according to claim 1, wherein reporting the baseline of the integrated software program on the computer as the particular baseline is performed in response to receiving a request for a current baseline of the integrated software program on the computer from the consumer process.

20. A computer, according to claim 9, wherein reporting the baseline of the integrated software program on the computer as the particular baseline is performed in response to receiving a request for a current baseline of the integrated software program on the computer from the consumer process.

* * * * *